United States Patent [19]

Kukes et al.

[11] Patent Number: 5,446,002
[45] Date of Patent: Aug. 29, 1995

[54] RESID HYDROPROCESSING CATALYST

[75] Inventors: Simon G. Kukes, Naperville, Ill.; Thomas J. Karol, Norwalk, Conn.; Joseph T. Joseph, Naperville, Ill.

[73] Assignee: Amoco Corporation, Chicago, Ill.

[21] Appl. No.: 255,643

[22] Filed: Jun. 8, 1994

[51] Int. Cl.⁶ .............................................. B01J 31/00
[52] U.S. Cl. ..................................... 502/155; 502/171; 502/220; 502/305; 548/105; 549/3; 549/210
[58] Field of Search ............... 502/155, 171, 220, 305; 548/101, 105; 549/3, 210

[56] References Cited

U.S. PATENT DOCUMENTS 5,198,100  3/1993  Aldridge et al. ............... 502/220 X
5,300,274  4/1994  Wei et al. ........................ 502/220 X

*Primary Examiner*—Michael Lusignan
*Attorney, Agent, or Firm*—Scott P. McDonald; Richard A. Kretchmer

[57] ABSTRACT

2,4-Heteroatom-substituted-molybdena-3,3-dioxocyclopentane hydro-conversion catalysts are disclosed. In some embodiments, inexpensive bulk catalysts in accordance with the present invention are synthesized from bulk triglyceridic epoxides or fatty acids.

20 Claims, No Drawings

RESID HYDROPROCESSING CATALYST

FIELD OF THE INVENTION

The invention relates to catalysts and processes for hydrotreating heavy feedstocks such as petroleum residuum. The invention more particularly relates to organic, oil-soluble catalysts having five-membered heterocyclic ring structures which can contain sulfur, nitrogen, molybdenum, oxygen and carbon ring members.

BACKGROUND OF THE INVENTION

Maximizing the yield of highly-valued products from crude oil often results in the production of relatively heavy hydrocarbon streams which are difficult to upgrade to lighter products. Typically, these streams are the distillation bottoms resulting from the atmospheric or vacuum distillative reduction of a crude oil or a crude oil-derived feedstream. These "bottoms" fractions are known as petroleum residuum or "resid." Resids typically contain only a small amount of material boiling below about 1000° F. at atmospheric pressure, up to several tens of percent of Ramsbottom carbon, and up to several hundred parts per million of metals such as nickel and vanadium.

Modern refinery economics demand that resids be aggressively processed to yield lighter and more valuable hydrocarbons. Typically, resid will be upgraded in a multi-reactor, supported catalyst system such as those disclosed in U.S. Pat. Nos. 4,940,529; 5,013,427; 5,124,025; 5,124,026, and 5,124,027, the disclosures of which are hereby incorporated by reference. While supported catalyst systems such as those disclosed in the foregoing patents have proven highly effective in upgrading heavy feedstreams such as resids, refiners continue to investigate other processes for obtaining more valuable products from resids.

Another approach for upgrading resid is to hydrotreat resid in the presence of an oil-soluble catalyst. This approach is disclosed in U.S. Pat. No. 5,055,174 and the earlier patents disclosed therein. The '174 patent teaches that hydrocarbon-containing feedstocks can be upgraded by contacting hydrogen and the hydrocarbon-containing feedstock in the presence of an oil-soluble molybdenum dithiocarbamate or a molybdenum dithiophosphate. While the process disclosed in the '174 patent may prove to be advantageous in some situations, the oil-soluble liquid catalysts disclosed therein are believed to be relatively expensive to produce and therefore may be potentially undesirable for use in a continuous refinery process.

Another approach to upgrading hydrocarbonaceous feedstocks such as resid is to introduce a soluble catalyst such as dimanganese dicarbonyl or chromium hexacarbonyl into the feedstock prior to upgrading the feedstock in the presence of hydrogen and a supported catalyst. Such an approach is disclosed in U.S. Pat. No. 4,578,180. As with the '174 patent, the processes disclosed in the '180 patent may under certain conditions prove useful, but the advantages of those processes may be limited by the cost of preparing the disclosed oil-soluble, metal-containing catalysts.

To facilitate the cost-efficient upgrading of hydrocarbon feedstocks such as resid, new catalysts and processes are required which minimize catalyst preparation costs and maximize the effectiveness of soluble catalysts under the aggressive operating conditions typically required to produce substantial quantities of lighter, more valuable products from a heavy hydrocarbon feedstock such as resid.

SUMMARY OF THE INVENTION

In a first aspect of the invention, catalysts useful for hydroprocessing hydrocarbonaceous feed materials are disclosed which have the structure {I}, below:

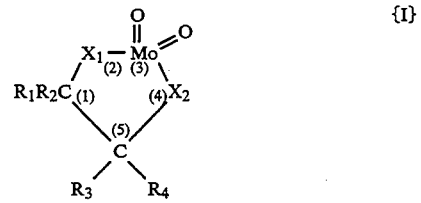

in which $X_1$ and $X_2$ are selected from the group consisting of O, S or NH and in which $R_1$, $R_2$, $R_3$ and $R_4$ are independently selected from the group consisting of hydrogen or an alkyl, aryl or alkyl/aryl hydrocarbon group containing from 1 to 40 carbon atoms or heteroatom-substituted variants thereof in which one or more hydrogen atoms have been substituted for by oxygen-, sulfur- or nitrogen-containing functional groups.

In another embodiment, the catalyst useful for hydroprocessing the hydrocarbonaceous feedstock comprises a 2,4-heteroatom substituted-molybdena-3,3-dioxacyclopentane-containing, triglyceride-derived compound.

As used herein, the term "2,4-heteroatom substituted-molybdena-3,3-dioxacyclopentane-containing triglyceride-derived compound" is used to describe a 2,4-heteroatom substituted-molybdena-3,3-dioxacyclopentane-containing compound obtained by reacting a diol- and thiol-alcohol-triglyceride derivative in the presence of molybdenum.

As used herein, the term "diol- and thiol-alcohol-triglyceride derivative" is used to refer to a compound obtained by reacting an epoxidized triglyceride with suitable reagents to form diol- and/or thiol-alcohol-compounds in which the thiol and/or alcohol functional groups are attached to the adjacent carbon atoms originally contained in the epoxide ring structure.

In some of the these embodiments, the catalyst is synthesized from a naturally-occurring, unsaturated triglyceride selected from the group consisting of beef tallow, butter, corn oil, cotton seed oil, lard, olive oil, palm oil, palm kernel oil, peanut oil, soybean oil, cod liver oil, linseed oil and mixtures thereof.

In yet another embodiment, the catalyst useful for hydroprocessing a hydrocarbonaceous feedstock is a 2,4-heteroatom substituted-molybdena-3,3-dioxacyclopentane-containing, fatty acid-derived compound As used herein, the term "diol- and thiol-alcohol-fatty-acid derivative compound" refers to a compound obtained by reacting an epoxidized fatty acid with suitable reagents to form compounds in which the diol- or thiol-alcohol-functional groups are attached to the carbon atoms originally contained in the epoxide ring structure.

In still another aspect of the invention, a composition is disclosed which contains a sufficient amount of a catalytic compound having the structure

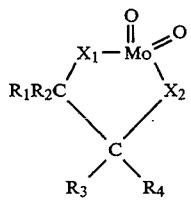

where $X_1$ and $X_2$ are selected from the group consisting of O, S or NH and wherein $R_1$, $R_2$, $R_3$ and $R_4$ are independently selected from the group consisting of hydrogen or an alkyl, aryl or alkyl/aryl hydrocarbon group containing from 1 to 40 carbon atoms or variants thereof in which one or more hydrogen atoms have been substituted for by one or more oxygen-, sulfur- or nitrogen-containing functional groups to yield a concentration of molybdenum metal in the composition of between 20 and 1000 parts per million; and a petroleum resid containing at least 50 weight percent of material boiling above about 650° F. at atmospheric pressure.

As used herein, the term "petroleum resid" or "resid" refers to hydrocarbonaceous feedstock containing at least 50 weight percent of material boiling above about 650° F. at atmospheric pressure without regard for whether the feedstock is the product of a distillation process.

DETAILED DESCRIPTION OF THE INVENTION

Each of the catalysts disclosed in the following detailed description comprises one or more compounds having a five-membered ring system having as ring members one molybdenum atom, two carbon atoms, and fourth and fifth atoms selected from the group consisting of oxygen, nitrogen and sulfur.

The foregoing catalytic compounds can be described generically as 2,4-heteroatom-substituted-molybdena-3,3-dioxocyclopentanes having the Structure {I}, below:

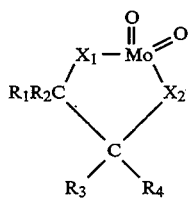

where $X_1$ and $X_2$ are selected from the group consisting of O, S or NH.

Three subgenera believed to be particularly useful for hydroprocessing of heavy feedstocks such as petroleum resids are illustrated as Structures II, III and IV, below.

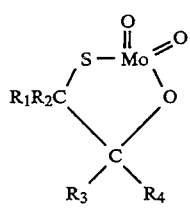

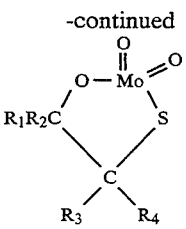

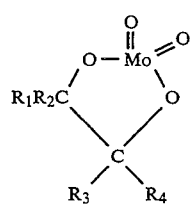

Structure II represents a first subgenus in which the oxy-molybdena3,3-dioxycyclopentanes are 2-thio-3-molybdena-4-oxa-3,3-dioxocyclopentanes.

Structure III represents a second subgenus in which the thio-oxy-molybdena-3,3-dioxycyclopentanes are 2-oxy-3-molybdena-4-thio-3,3-dioxocyclopentanes.

Structure IV represents a third subgenus in which the oxy-molybdena-3,3-dioxycyclopentanes are 2,4-oxy-3-molybdena-3,3-dioxocyclopentanes.

In each of the foregoing structures, $R_1$ can be hydrogen, or an alkyl, aryl or alkyl/aryl hydrocarbon group containing from 1 to 40 carbon atoms or heteroatom-substituted variants thereof in which one or more hydrogen atoms have been substituted for by oxygen, sulfur or nitrogen-containing functional groups. $R_1$ preferably contains between 4 and 25 carbon atoms, and most preferably, between about 6 and 18 carbon atoms when the catalyst is to be used for resid hydroprocessing applications. In each subgenera, $R_2$, $R_3$, and $R_4$ preferably are hydrogen, but also can be alkyl, aryl or alkyl/aryl groups containing from 1 to about 40 carbon atoms. As will be discussed in detail below, groups $R_2$–$R_4$, and to a lesser extent $R_1$, can sterically hinder ring formation and therefore should be selected to minimize interference with ring formation.

2,4-Heteroatom substituted-molybdena-3,3-dioxacyclopentanes can be synthesized from reagents having thiol, amine or alcohol functional groups attached to adjacent atoms such as alpha-beta-hydroxymercapto compounds, or from compounds having the same functional groups attached to adjacent carbon atoms such as diols. The generic structure of such reagents is provided as Structure V, below:

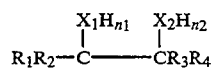

where $X_1$ and $X_2$ are selected from the group consisting of O, S or N and where $n_1$ or $n_2 = 1$ when $X_1$ or $X_2$ is O or S and $n_1$ or $n_2 = 2$ where $X_1$ or $X_2$ is N and where $R_{1-4}$ can be hydrogen or an alkyl, aryl or alkyl/aryl hydrocarbon group containing from 1 to 40 carbon atoms or variants thereof in which one or more hydrogen atoms have been substituted for by one or more oxygen-, sulfur- or nitrogen-containing functional groups.

Typically, the required reagents can be produced by "opening up" an epoxide to produce the reagent. To produce a desired diol, the precursor epoxide can be hydroxylated in the presence of an acid or base such as by a peroxy acid or a permanganate to yield the desired diol. It should be noted that while peroxy acid and permanganate hydroxylations are known to yield stereochemically-different products, either stereoisomer is believed to be suitable as a reagent for catalyst synthesis. In the case of the hydroxy-mercapto compounds, the precursor epoxide can be reacted with hydrogen sulfide gas in the presence of tertiary amine catalyst and water to yield the desired hydroxy-mercapto reagent. Amine-containing reagents can be similarly prepared from aziridines by reacting the aziridine with $H_2S$ gas or in a peroxy acid or permanganate hydroxylation, depending on whether the functional group on the carbon atom adjacent the carbon atom bearing the amine is desired to be a thiol or an alcohol.

The catalysts are produced by reacting molybdenum with the diol or hydroxy-mercapto compound to produce a five-membered ring structure in which the molybdenum atom becomes bound to the oxygen atom from an alcohol group and to either a second oxygen atom in the case of a diol, or to a sulfur atom, in the case of a hydroxy-mercapto reagent. Preferred sources of molybdenum are molydic acid, ammonium molybdate and molybdenum oxides, with molybdenum trioxide being most preferred.

Ring closure is favored when the diol, hydroxy-mercapto or other functional group is located at the terminal end of a molecule. An example of the preparation of oxy-molybdena-3,3-dioxycyclopentanes from beta-hydroxy-hexadecathiol is discussed in detail below.

EXAMPLE 1

The following materials were charged into a one liter flask: 8 grams of triethylamine, 0.6 grams of 2-pyrol, 0.6 grams of 2-beta-hydroxyethyloctadecylimidazoline, 8 grams of water, and 8 grams of molybdenum trioxide. The charged mixture was simultaneously stirred and refluxed for 30 minutes. 31.4 grams of beta-hydroxy-hexadecylthiol and 7.3 grams of a diluent oil were then added to the flask. The flask was fitted with a Dean Stark trap loaded with triethylamine and heated to 130°-135° C. to azeotrope water from the mixture. When no further water was obtained from the Dean Stark trap, the reaction was stripped of volatile solvents by applying vacuum. The product was then obtained by vacuum filtration of the reaction mixture.

The product obtained from Example 1 was predominantly 1-n-tetradecyl-2-thio-3-molybdena-4-oxa-3,3-dioxocylopentane. Additionally, the product is believed to contain lesser amounts of 1-n-tetradecyl-2-oxa-3-molybdena-4-thio-3,3-dioxocylopentane. The multiplicity of products is believed to result from the fact that the reaction of hexadecyl-1-epoxide with $H_2S$ to produce beta-hydroxy-hexadecylthiol is also believed to yield small amounts of the 1-hydroxy-hexadecyl-2-thiol. The 2-thio reagent compound reacts under the stated reaction conditions to produce 4-thio product compound, thereby yielding a mixture of compounds from the first and second subgenera described above.

The product formed when opening an epoxide such as the one discussed in Example 1 is a result of competing thermodynamic and kinetic reaction pathways. The predominance of the 2-thio product is believed to be evidence that the thermodynamic pathway was predominant at the stated experimental conditions. Because either product, as well as a mixture of the two products, is believed to be catalytically-useful, there is no reason to separate 2-thiol compound from 1-thiol compound prior to catalyst synthesis when both are produced from the corresponding epoxide precursor. Eliminating such a step, of course, further reduces catalyst preparation costs.

The synthesis described in Example 1 is believed to be especially well-suited to producing compounds for which $R_1$ is within the range of 6 to 18 carbon atoms and for which $R_2$, $R_3$ and $R_4$ are hydrogen atoms. The stated conditions are also believed to be particularly suitable for producing the corresponding 2,4-dioxy-ring compounds from diol reagents.

Especially inexpensive catalysts in accordance with the present invention can be produced from bulk-epoxidized, naturally-occurring triglycerides. In this case, unsaturated bonds in the fatty acid residues present in the triglycerides first are epoxidized during a bulk epoxidation process. The epoxidized triglycerides are then converted to diols, or thiol-alcohols and then to the corresponding ring-containing compounds as previously described. For purposes of this application, the term "diol-, and thiol-alcohol-triglyceride derivatives" refers to compounds obtained by reacting the epoxidized triglycerides with suitable reagents to form the diol-, and/or thiol-alcohol-compounds in which the thiol and/or alcohol functional groups are attached to the carbon atoms originally contained in the epoxide ring structure. The term "2,4-heteroatom substituted-molybdena-3,3-dioxacyclopentane-containing triglyceride-derived compounds" is used to generically describe the 2,4-heteroatom substituted-molybdena-3,3-dioxacyclopentane-containing compounds obtained by reacting the diol-, and thiol-alcohol-triglyceride derivatives in the presence of molybdenum.

Oils containing triglycerides believed to be particularly well-suited for use as heavy hydrocarbonaceous feedstock catalyst precursors include those oils having at least about 15 weight percent or more of unsaturated fatty acid residue chains having chain lengths between 6 and 20 carbon atoms. These oils include beef tallow, butter, corn oil, cotton seed oil, lard, olive oil, palm oil, palm kernel oil, peanut oil, soybean oil, cod liver oil and linseed oil.

Catalyst mixtures in accordance with the present invention can also be prepared by epoxidizing and converting to diol- and thiol-alcohol-containing fatty acid derivatives that can be obtained by hydrolyzing the triglycerides with an aqueous caustic solution. For purposes of this application, the term "diol- and thiol-alcohol-fatty-acid derivatives" refers to compounds obtained by reacting the epoxidized fatty acids with suitable reagents to form compounds in which the diol- or thiol-alcohol-functional groups are attached to the carbon atoms originally contained in the epoxide ring structure. The term "2,4-heteroatom substituted-molybdena-3,3-dioxacyclopentane-containing fatty acid-derived compounds" is used to generically describe the 2,4-heteroatom substituted-molybdena-3,3-dioxacyclopentane-containing compounds obtained by reacting the diol- and thiol-alcohol-fatty acid derivatives in the presence of molybdenum. The mixture of catalytic material prepared in this manner may be more soluble in some hydrocarbonaceous feedstreams.

In the following Examples 2 and 3, 1, 2-hydroxy amino compounds are derivatized to produce molybdenum compounds having the generic, intermediate structure VI and final structure VII, below:

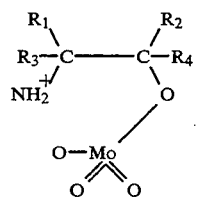

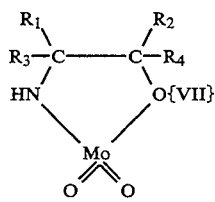

EXAMPLE 2

In the following example, a commercially available expoxidized 2-ethylhexyltalloate was reacted with excess ammonium and then converted to the desired molybdenum compound.

113 grams of DRAPEX 4.4, a commercially available 2-ethylhexyltalloate from Witco Chemical Company was added to a stirring solution of 100 ml concentrated ammonium hydroxide dissolved in 200 ml of isopropanol. This solution was then warmed to 80° C. for 1 hour. An intermediate alcohol-amine-ester was isolated by diluting with 250 ml of acetone, filtering, and rotary evaporating the solvent to yield the liquid intermediate. 105.5 grams of the intermediate was converted to the desired molybdenum compound by charging with 24 grams water, 18.3 grams of ammonium heptamolybdate, 6.3 grams of 2-beta-hydroxyethyloctadecylimidazoline and 0.25 ml of antifoamant silicone-oil/water emulsion. The reagents were stirred at 70°–80° C. for 1 hour, heated and simultaneously stripped of solvent to a temperature of 135°–140° C. The product was maintained at 135°–140° C. under vacuum until no further evolution of water occurred. The product was isolated by filtration to yield a brown/green liquid with 7.0% Mo content.

EXAMPLE 3

In this example, an epoxidized tall oil analog of 2-ethylhexyl talloate was prepared in the laboratory and subsequently converted to an alcohol-amine-acid ammonium salt by reaction with excess ammonium as in Example 2. The intermediate (275 g) was converted to the molybdenum compound as Example 2 by using the same ratios of reagents: water (64.6 g), imidazoline (16.6 g), ammonium heptamolybdate (48 g) and a small amount of antifoamant. The product was thicker than Example 2 and was filtered with acetone solvent followed by rotary evaporation of the solvent. The synthesis yielded a viscous brown liquid with 7.7% Mo content.

In the following Examples 4, 5 and 6, 1,2-diol molybdate catalysts were prepared. The prepared catalysts are characteristically the generic structure IV previously identified above.

EXAMPLE 4

163.2 g of DRAPEX 4.4, a commercially expoxidized 2-ethyl hexyl talloate, available from Witco Chemical Company was converted to a 1,2-diol by heating with 25 g of water and 0.5 ml of 70% methanesulfonic acid at 70°–75° C. for 1.5 hours. The intermediate diol was converted to the desired molybdenum compound by the same method as in Example 2, using the molar ratios specified therein. The product was isolated as in Example 2 to yield a green/brown liquid containing 6.8% Mo. Chromatographic analysis of the product demonstrated the absence of any 2-ethylhexanol by-product.

EXAMPLE 5

300 g of VIKOFLEX 7170, a commercially available expoxidized soybean oil available from ATOCHEM, 50 g of water, and 1.3 g of 70% methanesulfonic acid were charged to a reactor. The stirred emulsion was heated at 70° 75° C. for a period of 3 hours. Thereafter, 31 g of water, 60 g of ammonium molybdate, 21 g of 2-beta-hydroxyethyloctadecylimidazoline, and a small amount of antifoamant, were charged into the emulsion. The temperature was maintained at 70°–75° C. for 1 hour. The reaction product was then stripped of solvent with simultaneous heating to a temperature of 135°–140°C. The reaction was maintained under these conditions until no further overhead water was produced. Filtration yielded the final product which was a viscous green liquid with a molybdenum content of 3.38%.

EXAMPLE 6

In this Example, a polyisobutyl 1,2-diol molybdate catalyst is prepared. This method is applicable generally to polymers with "ene" functionality which can be converted to expoxide or diol, such as poly alpha olefins, polypropylene, etc.

300 grams of ACTIPOL E6, a commercially available 365 average molecular weight expoxidized polyisobutylene, 70 g of water, 1.5 ml of 70% methanesulfonic acid, and 0.5 ml of antifoamant B (a silicone oil/water emulsion), were charged to a reactor and heated to reflux for a period of 10 hours. The reaction mixture was cooled to 70°–80° C., and 2 ml of concentrated ammonium hydroxide, 60 g of ammonium heptamolybdate and 20 grams of 2-beta-hydroxyethyloctadecylimidazoline were charged into the reaction mixture. The reaction was heated slowly to 135°–140° C. to allow water to boil off. Immediately thereafter a vacuum was slowly applied until full vacuum was reached. The reaction was maintained under full vacuum one hour and then filtered hot to yield a green liquid. Digestion followed by atomic absorption (as with previous Examples) yielded a molybdenum concentration of 3.47%, although this polymer digestion is not easily completed and the measured Mo concentration may, therefore, have been lower than actually attained.

The oil-soluble molybdenum-containing catalysts disclosed above can be used to facilitate the hydroconversion of virtually any relatively heavy hydrocarbonaceous feedstock to a relatively lighter product. Suitable feedstocks can be derived from naturally-occurring materials such as petroleum, coal, tar sands, and oil shales as well as waste plastics and waste streams from various petrochemical processes. Operating conditions generally should be at pressures from atmospheric to about 8000 psi, at hydrogen partial pressures ranging from 10 to 90 percent of the total pressure, and at temperatures ranging from about 200° to 1200° F.

The catalyst may be added directly to the reactor or mixed with the feedstock at a location immediately upstream of the reactor. If the catalyst is mixed with the feedstock upstream of the reactor, sufficient catalyst should be added to provide a molybdenum metal concentration in the feedstock/catalyst mixture of between about 20 and 1000 parts per million.

The oil-soluble catalysts in accordance with the present invention are particularly well-suited to catalyzing the conversion of petroleum resids to lighter, more valuable products. As used in this application, the term "petroleum resid" or "resid" refers to feedstocks containing at least 50 weight percent of material boiling above about 650° F. at atmospheric pressure without regard for whether the feedstock is the product of a previous distillation product. Typically, resid will contain at least seventy weight percent of material boiling above about 1000° F. at atmospheric pressure and will be the bottoms product from one or more atmospheric or vacuum distillations.

When the feedstock is atmospheric or vacuum petroleum residua, the conversion preferably occurs in the presence of hydrogen gas at total pressures between about 200 and 8000 psi, at hydrogen partial pressures ranging from 20 to 90 percent of the total pressure, and at temperatures ranging from about 200° to 1200° F. More preferably, the conversion occurs at total pressures between about 1000 and 3000 psi at hydrogen partial pressures ranging from 20 to 90 percent of the total pressure and at temperatures between about 500° and 1000° F. Most preferably, the conversion occurs at total pressures between about 1000 and 3000 psi, at hydrogen partial pressures ranging from 50 to 90 percent of the total pressure and at temperatures between about 700° and 900° F. Catalyst concentration in the resid feedstock should be such as to provide between about 20 to 800 parts per million of molybdenum metal in the catalyst/resid mixture, and preferably between about 50 and 200 parts per million of molybdenum metal in the resid/feedstock mixture.

It is believed that soluble metal catalysts of the type described above are effective in the hydrotreatment of heavy feedstocks like petroleum resid because the finely-dispersed metal contained therein catalyzes hydrogen transfer reactions which "cap" thermally-produced free radicals before the radicals can condense to form coke or coke precursors.

The performance of 2,4-heteroatom-substituted-molybdena-3,3dioxocyclopentanes as catalysts for resid hydrotreating is illustrated by Example 7, below.

EXAMPLE 7

Approximately 30 grams of a resid feedstock having the characteristics listed in Table 1, below, was mixed with sufficient 1-n-tetradecyl-2-thio-3-molybdena-4-oxa-3,3-dioxocylopentane to produce a molybdenum metal concentration in the feedstock of about 100 parts per million. The catalyst and feedstock mixture was charged to a 300 cc stainless steel stirred autoclave. The autoclave was purged and pressurized with hydrogen to about 800 - 1000 psig ambient pressure. The charged reactor was heated for about 30 minutes until the reactor reached the 815° F. operating temperature, at which time the reactor was allowed to operate at 815° F. for sixty minutes. After the sixty-minute reaction period ended, the reactor was cooled to room temperature. The contents of the reactor was transferred to a Millipore filter using a toluene solvent to collect coke particles. The coke particles were washed with toluene and dried to constant weight in a nitrogen-purged vacuum oven. Liquid products were measured using gas chromatograph simulated distillation.

Table 1 lists several measured characteristics of the resid feedstock used in Example 7, a baseline run performed on the resid feedstock used in Example 7 in the absence of catalyst, and the products from Example 3. The abbreviation "w/o" in Tables 1 and 2 means weight percent. As can be seen by comparing the catalyzed reaction to the non-catalyzed reaction, the 1-n-tetradecyl-2-thio-3-molybdena-4-oxa-3,3-dioxocylopentane catalyst dramatically reduced the weight percent of coke formed and produced a slight increase in yield of 1000° and 1328° F. products.

TABLE 1

|  | Feedstock | Non-catalyzed Reaction | Reaction w/Catalyst |
| --- | --- | --- | --- |
| Coke, w/o | 0 | 4.3 | 0.9 |
| Ramscarbon, w/o | 13.8 | 16.0 | 12.3 |
| GC-simulated product distribution, w/o | | | |
| 650° F.- | 5 | 31 | 29 |
| 850° F.- | 24 | 57 | 56 |
| 1000° F.- | 38 | 72 | 74 |
| 1328° F.- | 88 | 89 | 95 |
| Hydrogen, w/o | 10.08 | 9.53 | 9.95 |
| Sulfur, w/o | 3.26 | 3.19 | 2.25 |
| Carbon, w/o | 85.56 | 86.01 | 84.56 |
| Nitrogen, w/o | 0.34 | 0.51 | 0.52 |
| H/C, ratio | 1.41 | 1.33 | 1.38 |
| Molybdenum, ppm | — | 0 | 100 |
| Reaction Time, minutes | — | 60 | 60 |
| Hydrogen Partial Pressure, psi | — | 1500 | 1500 |
| Temperature, °F. | — | 815 | 815 |

The advantages of using 2,4-heteroatom-substituted-molybdena-3,3dioxocyclopentanes for resid conversion become more apparent as the reaction temperature and catalyst concentration is increased as shown by Example 8, below.

EXAMPLE 8

A one-hour test in a stirred autoclave was performed as in Example 3, except that the one-hour reaction temperature was 842° F. and sufficient catalyst was added to bring the molybdenum concentration up to 200 ppm molybdenum metal. The results of Example 8 are presented in Table 2, below.

TABLE 2

|  | Feedstock | Non-catalyzed Reaction | Reaction w/Catalyst |
| --- | --- | --- | --- |
| Coke, w/o | 0 | 11.3 | 2.8 |
| Ramscarbon, w/o | 13.8 | — | 9.5 |
| GC simulated product distribution, w/o | | | |
| 650° F.- | 5 | — | 42 |
| 850° F.- | 24 | — | 71 |
| 1000° F.- | 38 | — | 85 |
| 1328° F.- | 88 | — | 99 |
| Hydrogen, w/o | 10.08 | — | 9.85 |
| Sulfur, w/o | 3.26 | — | 2.68 |
| Carbon, w/o | 85.56 | — | 85.67 |
| Nitrogen, w/o | 0.34 | — | 0.62 |
| H/C, ratio | 1.41 | — | 1.38 |
| Molybdenum, ppm | — | 0 | 200 |
| Reaction Time, minutes | — | 60 | 60 |
| Hydrogen Partial Pressure, psi | — | 1600–1900 | 1600–1900 |
| Temperature, °F. | — | 842 | 842 |

As can be seen in Table 2, the non-catalyzed baseline reaction produced 11.3 weight percent coke. This high coke make precluded analysis for the remaining parameters listed in Table 2. In comparison, the catalyzed reaction produced only 2.8 weight percent coke.

The foregoing discussion of catalysts is intended only to provide examples in accordance with the present invention. Other catalysts will be apparent to those of ordinary skill in the art after reviewing the foregoing disclosure, and the scope of the invention is, therefore, intended to be limited only by the following claims.

We claim:

1. A catalyst useful for hydroprocessing hydrocarbonaceous feed materials comprising the composition:

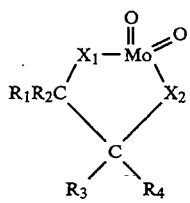

where $X_1$ and $X_2$ are selected from the group consisting of O, S or NH, and wherein $R_1$, $R_2$, $R_3$ and $R_4$ are independently selected from the group consisting of hydrogen or an alkyl, aryl or alkyl/aryl hydrocarbon group containing from 1 to 40 carbon atoms or heteroatom-substituted variants thereof in which one or more hydrogen atoms have been substituted for by one or more oxygen-, sulfur- or nitrogen-containing functional groups.

2. The catalyst of claim 1 wherein $X_1$ and $X_2$ are selected from the group consisting of O and S and wherein $R_1$, $R_2$, $R_3$ and $R_4$ are independently selected from the group consisting of hydrogen or an alkyl, aryl or alkyl/aryl hydrocarbon group containing from 4 to 25 carbon atoms.

3. The catalyst of claim 1 wherein $X_1$ and $X_2$ are selected from the group consisting of O and S and wherein $R_1$ is selected from the group consisting of an alkyl, aryl or alkyl/aryl hydrocarbon group containing from 4 to 25 carbon atoms or heteroatom-substituted variants thereof in which one or more hydrogen atoms have been substituted for by one or more oxygen-, sulfur- or nitrogen-containing functional groups and wherein $R_2$, $R_3$ and $R_4$ are hydrogen.

4. The catalyst of claim 1 wherein $X_1$ and $X_2$ are selected from the group consisting of O and S and wherein $R_1$ is selected from the group consisting of an alkyl, aryl or alkyl/aryl hydrocarbon group containing from 6 to 18 carbon atoms and wherein $R_2$, $R_3$ and $R_4$ are hydrogen.

5. The catalyst of claim 4 wherein $R_1$ is a linear, saturated hydrocarbon.

6. The catalyst of claim 4 wherein $X_1$ is S and $X_2$ is O.

7. The catalyst of claim 4 wherein $X_1$ is O and $X_2$ is S.

8. The catalyst of claim 6 wherein $R_1$ is an n-tetradecyl hydrocarbon group.

9. The catalyst of claim 7 wherein $R_1$ is an n-tetradecyl hydrocarbon group.

10. A composition containing a sufficient amount of a catalytic compound having the structure

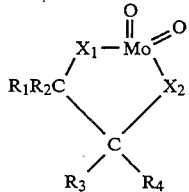

where $X_1$ and $X_2$ are selected from the group consisting of O, S or NH and wherein $R_1$, $R_2$, $R_3$ and $R_4$ are independently selected from the group consisting of hydrogen or an alkyl, aryl or alkyl/aryl hydrocarbon group containing from 1 to 40 carbon atoms or variants thereof in which one or more hydrogen atoms have been substituted for by one or more oxygen-, sulfur-or nitrogen-containing functional groups to yield a concentration of molybdenum metal in the composition of between 20 and 1000 parts per million; and a petroleum resid containing at least 50 weight percent of material boiling above about 650° F. at atmospheric pressure.

11. The composition of claim 10 wherein the resid contains at least seventy weight percent of material boiling above about 1000° F. at atmospheric pressure and is the bottoms product from a distillation.

12. The composition of claim 10 wherein $X_1$ and $X_2$ are selected from the group consisting of O and S and wherein $R_1$ is selected from the group consisting of an alkyl, aryl or alkyl/aryl hydrocarbon group containing from 6 to 18 carbon atoms and wherein $R_2$, $R_3$ and $R_4$ are hydrogen.

13. The composition of claim 11 wherein $X_1$ and $X_2$ are selected from the group consisting of O and S wherein $R_1$ is selected from the group consisting of an alkyl, aryl or alkyl/aryl hydrocarbon group containing from 6 to 18 carbon atoms and wherein $R_2$, $R_3$ and $R_4$ are hydrogen.

14. The composition of claim 10 wherein the resid is selected from the group consisting of resid produced by the vacuum or atmospheric distillation of a crude oil.

15. A catalyst useful for hydroprocessing a hydrocarbonaceous feedstock comprising a 2,4-heteroatom substituted-molybdena-3,3-dioxacyclopentane-containing, triglyceride-derived compound.

16. The catalyst of claim 15 further comprising a mixture of two or more different 2,4-heteroatom substituted-molybdena-3,3-dioxacyclopentane-containing, triglyceride-derived compounds.

17. The catalyst of claim 15 wherein the catalyst is synthesized from a naturally-occurring, unsaturated triglyceride selected from the group consisting of beef tallow, butter, corn oil, cotton seed oil, lard, olive oil, palm oil, palm kernel oil, peanut oil, soybean oil, cod liver oil, linseed oil and mixtures thereof.

18. A catalyst useful for hydroprocessing a hydrocarbonaceous feedstock comprising a 2,4-heteroatom substituted-molybdena-3,3-dioxacyclopentane-containing, fatty acid-derived compound.

19. The catalyst of claim 18 further comprising a mixture of two or more different 2,4-heteroatom substituted-molybdena-3,3-dioxacyclopentane-containing, fatty acid-derived compounds.

20. The method of claim 18 wherein the catalyst is synthesized from a fatty acid obtained by hydrolyzing a reagent selected from the group consisting of beef tallow, butter, corn oil, cotton seed oil, lard, olive oil, palm oil, palm kernel oil, peanut oil, soybean oil, cod liver oil, linseed oil and mixtures thereof.

* * * * *